United States Patent Office 2,733,161
Patented Jan. 31, 1956

2,733,161

METAL-CERAMIC BODY AND PROCESS OF PRODUCING THE SAME

Frank Andrew Lytton, Sheffield, and Joseph Alfred Cashmore, Stoneleigh, England, assignors to The Morgan Crucible Company Limited, London, England, a British company No Drawing. Application October 22, 1953,
Serial No. 387,788

Claims priority, application Great Britain
October 23, 1952

10 Claims. (Cl. 117—22)

This invention comprises an improved process for producing a metal-ceramic body.

It is well known that successful infiltration of liquid metal into a porous body is largely dependent on the liquid infiltrant having a sufficiently low surface tension when in contact with the porous body. With certain porous materials and certain metals infiltration can be readily achieved: For example, a porous tungsten body can be readily filled by infiltration of molten silver or copper, and a porous iron body can readily be filled by infiltration of molten copper.

There have recently been developed new types of material, known as metal ceramics, in which a refractory material forms one constituent and a suitable metal forms the other constituent.

Infiltration processes afford the possibility of producing metal-ceramic bodies with zero or negligible porosity. Unfortunately the "wetting" of ceramics, particularly refractory oxides such as alumina, by most metals is poor and infiltration does not therefore proceed readily.

The process, according to the present invention, for producing a metal-ceramic body by infiltration of molten silver into a porous alumina body is characterised by producing, on the internal surface or walls of the interconnecting pores of the alumina body, within and throughout the body, a coating of a metal oxide, namely copper oxide or vanadium pentoxide, and then effecting the infiltration. It is found that the presence of the metal oxide in the pores of the alumina body renders the latter readily wettable by the silver.

The metal oxide may readily be produced in situ by saturating the porous alumina body with a solution of a salt of the metal and thereafter converting the salt into the oxide.

For example, a porous alumina body is saturated with a solution of 10 parts by weight of copper nitrate in 100 parts by weight of water, preferably employing a vacuum to ensure thorough saturation. The body is then dried and baked at a temperature of about 400–600° C., whereby the copper nitrate is completely converted into copper oxide, which is formed as a thin oxide film upon the internal surfaces of the interconnected pores of the alumina body. The amount of copper oxide so deposited is about 1.85% based on the weight of the body. Infiltration with pure silver can then be readily effected by placing silver powder on the body and heating the whole to a temperature above the melting point of silver in an inert or an oxidizing atmosphere to prevent the reduction of the copper oxide.

As another example, the alumina body is saturated with a solution of ammonium vanadate in water. The ammonium vanadate is subsequently decomposed to vanadium pentoxide by drying and baking at a temperature of about 400–600° C. This likewise enables infiltration with pure silver to be readily effected.

The amount of the metal oxide introduced into the pores of the alumina body is dependent on the strength of the salt solution. It is a matter of simple experiment to determine what is the strength of a particular salt solution required to produce in the pores an amount of oxide which is the minimum compatible with successful infiltration of the molten silver.

The coating of the internal surface of the interconnected pores of the alumina body with a thin oxide film provides ideal conditions for the infiltration, and it can readily be ensured that the porous alumina body is filled practically completely with silver. Thus, samples of alumina having, before infiltration, an average porosity of 35%, an average density of 4, and an average cold transverse breaking strength of 9,000 pounds per square inch, were found to have, after infiltration of silver according to the invention, an average porosity of 1%, a density of 5.6 and a cold transverse breaking strength of 40,000 pounds per square inch. Of the weight of the body after infiltration, 56% was silver.

In the case of vanadium pentoxide, it has been found effective, according to another feature of the invention, to mix vanadium pentoxide powder itself with silver powder and, after placing the mixture on the porous alumina body, to apply heat to melt the silver which readily infiltrates into the pores of the alumina body. Alternatively, the vanadium pentoxide powder, instead of being mixed with the silver powder, may be spread as a layer between the silver and the porous alumina body. In either case the vanadium pentoxide, since it has a lower melting point than silver, will infiltrate into the pores of the alumina body to pre-coat the walls of the pores before the silver infiltrates.

The amount of vanadium pentoxide powder used as aforesaid may be about 5% by weight based on the weight of the alumina body which has an average porosity of 35%.

We claim:

1. Process for producing a metal-ceramic body by infiltration of molten silver into a porous alumina body, characterised by producing, on the walls of the interconnecting pores of the alumina body within and throughout said alumina body, a coating of a metal oxide of the group consisting of copper oxide and vanadium pentoxide, and then infiltrating molten silver into said alumina body through the coated pores.

2. Process according to claim 1 in which the metal oxide is produced in situ by saturating the porous alumina body with a solution of a salt of the metal and thereafter converting the salt into the oxide.

3. Process for producing a metal-ceramic body, by infiltration of molten silver into a porous alumina body, by placing upon the porous alumina body vanadium pentoxide powder, silver powder and applying heat to melt firstly the vanadium pentoxide powder and cause it to deposit on the walls of the interconnecting pores of the alumina body a coating of vanadium pentoxide, and continuing to apply heat sufficient to melt the silver powder and cause the molten silver to infiltrate said alumina body through the coated pores.

4. Process for producing a metal-ceramic body by infiltration of molten silver into a porous alumina body, characterised by the steps of saturating said alumina body with a solution of a heat decomposable salt of a metal of the group consisting of copper and vanadium to introduce the solution into the interconnected pores within and throughout said alumina body; converting the salt to its oxide to deposit a coating of the oxide on the walls of the pores; and infiltrating molten silver into the coated pores.

5. Process for producing a metal-ceramic body by infiltration of molten silver into a porous alumina body, characterised by the steps of infiltrating vanadium pentoxide into the pores of said alumina body to deposit a coating of vanadium pentoxide on the walls of said pores and then infiltrating molten silver into the coated pores of said alumina body.

6. Process for producing a metal-ceramic body by infiltration of molten silver into a porous alumina body, characterised by the steps of saturating said alumina body with an aqueous ammonium vanadate solution to introduce the solution into the interconnected pores within and throughout said alumina body; converting the ammonium vanadate to vanadium pentoxide to deposit a thin coating of the latter on the walls of the pores; and introducing molten silver into the coated pores.

7. Process for producing a metal-ceramic body by infiltration of molten silver into a porous alumina body, characterised by the steps of coating said alumina body with a mixture of vanadium pentoxide and silver and applying heat to melt the vanadium pentoxide and silver whereby firstly the vanadium pentoxide will melt and infiltrate into the pores of the body within and throughout said alumina body and coat the walls of said pores with a film of vanadium pentoxide and secondly the silver will melt and infiltrate said alumina body through the coated pores.

8. Process for producing a metal-ceramic body by infiltration of molten silver into a porous alumina body, characterised by the steps of coating said alumina body with a layer of vanadium pentoxide; applying a layer of silver over the layer of vanadium pentoxide; and applying heat to melt the vanadium pentoxide and silver whereby firstly the vanadium pentoxide will melt and infiltrate into the pores of the body within and throughout said alumina body and coat the walls of said pores with a film of vanadium pentoxide and secondly the silver will melt and infiltrate said alumina body through the coated pores.

9. A metal-ceramic body comprising a porous alumina body; a coating of a metal oxide of the group consisting of copper oxide and vanadium pentoxide on the walls of the pores of said alumina body; and silver filling the coated pores of said alumina body to the extent that about 56% of the weight of the metal-ceramic body is silver.

10. A metal-ceramic body comprising a porous alumina body; a coating of a metal oxide of the group consisting of copper oxide and vanadium pentoxide on the walls of the pores of said alumina body; and silver substantially filling the coated pores of said alumina body.

References Cited in the file of this patent

UNITED STATES PATENTS

| | | |
|---|---|---|
| 2,628,927 | Colbert et al. | Feb. 17, 1953 |
| 2,643,199 | Hersch | June 23, 1953 |

FOREIGN PATENTS

| | | |
|---|---|---|
| 573,142 | Great Britain | Nov. 8, 1945 |